(12) United States Patent  
Kerizac et al.

(10) Patent No.: US 8,819,645 B2  
(45) Date of Patent: Aug. 26, 2014

(54) APPLICATION ANALYSIS DEVICE

(75) Inventors: Franck Kerizac, Saint-Mande (FR); Antoine Sebilleau, Neuilly (FR)

(73) Assignee: Accenture Global Services Limited, Dublin (IE)

( * ) Notice: Subject to any disclaimer, the term of this patent is extended or adjusted under 35 U.S.C. 154(b) by 51 days.

(21) Appl. No.: 13/495,542

(22) Filed: Jun. 13, 2012

(65) Prior Publication Data  
US 2013/0042224 A1  Feb. 14, 2013

(30) Foreign Application Priority Data

Jun. 17, 2011  (EP) ..................................... 11305766

(51) Int. Cl.  
G06F 9/44       (2006.01)  
G06F 11/36      (2006.01)  
G06F 9/45       (2006.01)  
G06F 11/07      (2006.01)

(52) U.S. Cl.  
CPC .......... *G06F 11/076* (2013.01); *G06F 11/3624* (2013.01); *G06F 8/4441* (2013.01)  
USPC ....................................................... 717/133

(58) Field of Classification Search  
None  
See application file for complete search history.

(56) References Cited

U.S. PATENT DOCUMENTS

| | | | |
|---|---|---|---|
| 6,381,739 B1 | 4/2002 | Breternitz, Jr. | |
| 8,056,062 B2 * | 11/2011 | Bowers et al. | 717/136 |
| 8,473,899 B2 * | 6/2013 | Centonze et al. | 717/108 |
| 2004/0078691 A1 | 4/2004 | Cirne | |
| 2010/0058291 A1 * | 3/2010 | Hahn et al. | 717/113 |
| 2011/0231813 A1 * | 9/2011 | Seo et al. | 717/106 |

OTHER PUBLICATIONS

"A Callgraph-Based Search Strategy for Automated Performance Diagnosis", Harold W. Cain, et al., Euro-Par 2000, Aug. 1, 2000, pp. 1-15; retrieved from the Internet: URL: ftp://ftp.cs.wisc.edu/paradyn/papers/cain00callgraph.pdf, retrieved Sep. 14, 2011.

"Diploma Thesis: Utility Support for Checking Ocl Business Rules in Java Programs—Draft-", Ralf VViebicke, Jan. 1, 2000, pp. 1-45, Retrieved from the Internet: URL:http://www.yancy.org/school.lehigh/phd/links/dissertations/ocl_java/ocl_java.pdf, retrieved Sep. 14, 2011.

"GNU gprof—The GNU Profiler—Manual for version 2.9.1", Jay Fenlason, et al., Internet citation: Nov. 7, 1998, Retrieved from the Internet: URL:http://www.gnu.org/software/binutils/manual/gprof-2.9.1/html_mono/gpr of .html, retrieved Oct. 24, 2007.

European Search Report issued in EP 11 30 5766 on Sep. 15, 2011.

* cited by examiner

*Primary Examiner* — Li B Zhen  
*Assistant Examiner* — Sen Chen  
(74) *Attorney, Agent, or Firm* — Harrity & Harrity, LLP (57) ABSTRACT

The invention concerns a method for performing a run-time simulation of a computer program comprising: extracting said computer program from a first application environment to a second application environment; parsing said computer program to generate a hierarchical representation of said computer program; based on said hierarchical representation, inserting at least one log value generation instruction into said extracted computer program to generate an enhanced computer program; re-injecting said enhanced computer program into said first application environment; executing, in said first application environment, said enhanced computer program; and receiving from said first application environment generated log values and analyzing said values with respect to a hierarchical representation of said computer program.

20 Claims, 5 Drawing Sheets

APPLICATION ANALYSIS DEVICE

FIELD

The present disclosure relates to a method and device for analyzing a computer application, and in particular for generating an alert during an analysis of performance and/or test exhaustiveness of a computer application operating in a given environment.

BACKGROUND

Computing applications may be developed to perform defined functions when executed in a given environment, such as the Windows environment, the SAP (Systems, Applications and Products) environment or other types of system environments (the names "Windows" and "SAP" may be registered trademarks). For example, applications in the SAP environment may be written in the ABAP (Advanced Business Application Programming) language.

Before achieving a final release of a given application, the operation of the computing application must be rigorously tested as regards its performance and/or quality, based on simulations. Within a given environment, certain analysis tools may be available for performing such tests.

However, there are technical difficulties in implementing such test simulations efficiently. Furthermore, there are technical difficulties in devising analysis techniques and algorithms that allow the computing application to be tested adequately.

SUMMARY

It is an aim of embodiments of the present invention to at least partially address one or more difficulties in the prior art.

According to one aspect, there is provided a method, for example implemented by a processing device, for performing a run-time simulation of a computer program comprising: extracting said computer program from a first application environment to a second application environment; parsing said computer program to generate a hierarchical representation of said computer program; based on said hierarchical representation, inserting at least one log value generation instruction into said extracted computer program to generate an enhanced computer program; re-injecting said enhanced computer program into said first application environment; executing, in said first application environment, said enhanced computer program; and receiving from said first application environment generated log values and analysing said values with respect to a hierarchical representation of the computer program.

According to one embodiment, the method further comprises comparing the generated log values with at least one threshold and generating an alert based on said comparison.

According to another embodiment, the method further comprises parsing the enhanced computer program to generate a second hierarchical representation of the computer program, wherein the log values are analysed with respect to the second hierarchical representation.

According to a further embodiment, the threshold is selected by an identification of the log value based on the second hierarchical representation of the computer program.

According to a further embodiment, the method further comprises identifying at least one portion of the computer program associated with the at least one log value by determining the insertion locations of the log value generation instructions with respect to the hierarchical representation.

According to a further embodiment, the step of determining the insertion locations with respect to the hierarchical representation comprises generating a hierarchical representation of the enhanced computer program.

According to a further embodiment, the method further comprises modifying the identified portion of the computer program based on the at least one log value.

According to a further embodiment, the log value indicates at least one of: an execution of at least one instruction; and an execution time of at least one instruction.

According to a further aspect, there is provided a device for performing a run-time simulation of a computer program, the device comprising for example a processing device implementing: a code extractor arranged to extract said computer program from a first application environment to a second application environment; a parser arranged to parse said computer program to generate a hierarchical representation of said computer program; a code enhancement unit arranged to insert, based on said hierarchical representation, at least one log value generation instruction into said extracted computer program to generate an enhanced computer program; a code re-injector arranged to re-inject said enhanced computer program into said first application environment for execution by a processing unit; and an analysis unit arranged to receive said generated at least one log values; to compare them with at least one threshold; and to generate an alert based on the comparison.

According to a further embodiment, the analysis unit is further arranged to identify at least one portion of the computer program associated with the log value by determining the insertion locations of the at least one log value generation instruction with respect to the hierarchical representation.

According to a further aspect, there is provided a test unit comprising the above device for performing a run-time simulation of a computer program.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

Throughout the figures, like features have been labelled with like reference numerals.

DETAILED DESCRIPTION OF EMBODIMENTS OF THE PRESENT DISCLOSURE

In the following, examples of the present invention have been discussed in relation to an application to be tested that is executed based on an ABAP (Advanced Business Application Programming) language program in an SAP (Systems, Applications and Products) environment, although it will be apparent to those skilled in the art that the invention could apply to applications executed based on alternative programming languages, and in alternative environments to the SAP environment.

Furthermore, only those aspects useful for an understanding of the invention have been described in detail, other details, such as the details of the treatment of particular keywords and statements used by the parser based on the ABAP program, will be apparent to those skilled in the art having some knowledge of the ABAP programming language.

Figure 1:
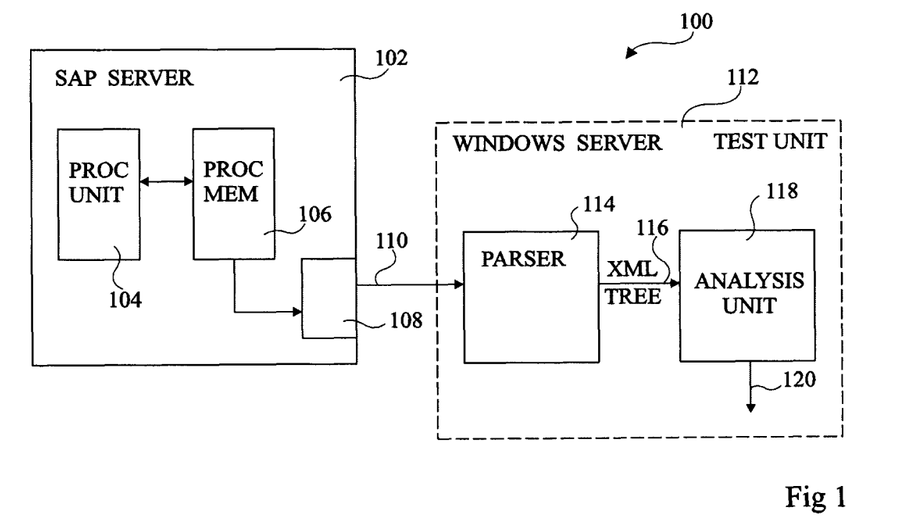
FIG. 1 illustrates an application analysis system according to an embodiment of the present invention.

FIG. 1 illustrates an application analysis system 100 comprising an SAP server 102, which provides an SAP environment within which a processing (PROC) unit 104 executes instructions based on a application stored in a program memory (PROG MEM) 106, written for example in the ABAP programming language.

According to the embodiments described herein, testing of the application stored in the program memory 106 is performed outside the SAP environment. For this, an extractor 108 extracts a copy of the application code, for example as a text document, and outputs this on an output line 110, to a test unit 112.

The test unit 112 is for example implemented in a Microsoft Windows environment, implemented by a Windows server, although it could be implemented in alternative environments, such as a Unix environment ("Microsoft Windows" and "Unix" are likely to be registered trademarks). The test unit 112 comprises a parser 114, which receives the ABAP code, and parses it to generate a hierarchical representation of the program, in this example in the form of an XML (extensible mark-up language) tree. In particular, the XML tree represents the execution steps of the program. The XML tree is provided on a line 116 to an analysis unit 118.

The analysis unit 118 analyses the XML tree, and generates a report, which is output on an output line 120 and for example comprises one or more alerts if any security, quality and/or performance problems are identified.

Figure 2:
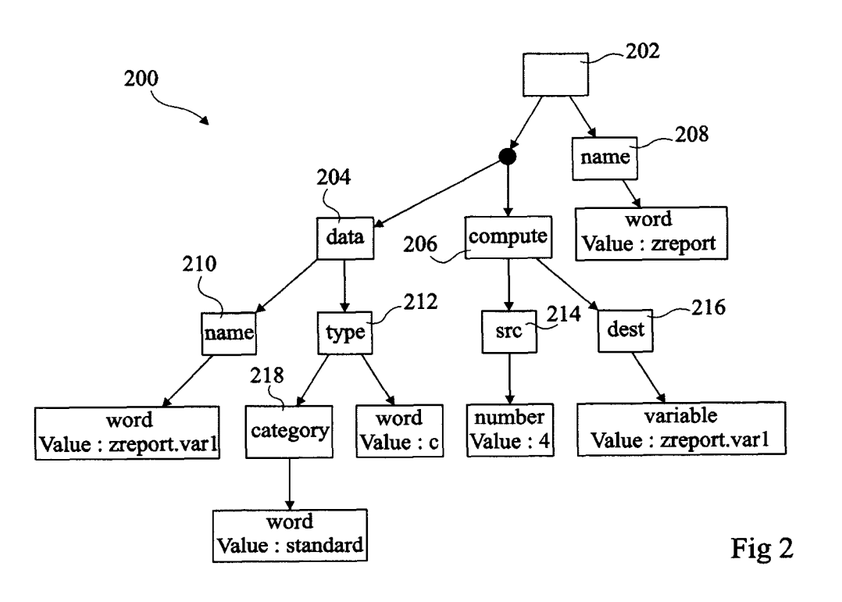
FIG. 2 illustrates an example of a hierarchical structure of an application according to an embodiment of the present invention.

FIG. 2 shows an example of a hierarchical representation of the ABAP application code generated by the parser 114 of FIG. 1. In this example, the ABAP code is as follows:

```
REPORT zreport.
DATA var1 TYPE c.
    var1 = 4.
```

As shown in FIG. 2, nodes 202, 204 and 206 are ABAP statements, which are instruction nodes. Node 208 to 216 come below the instruction nodes, and are parameter nodes, that identify a parameter. The child nodes of the parameter nodes are value nodes that define the value of the parameter, with the exception of node 218, which is a custom node indicating a category.

Figure 3A:
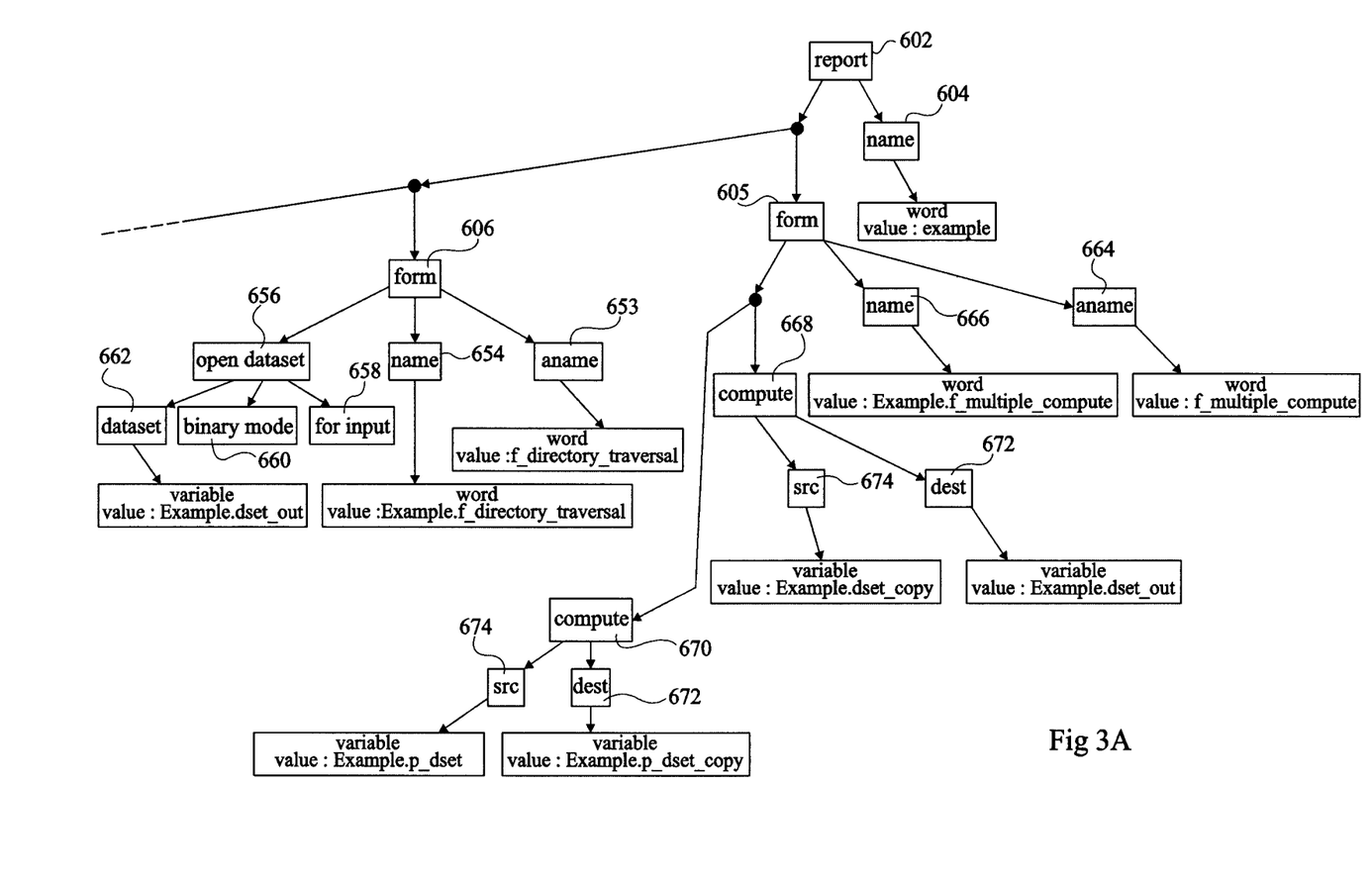
FIGS. 3A, 3B and 3C illustrate a further example of a hierarchical structure of an application according to an embodiment of the present invention.
Figure 3B:
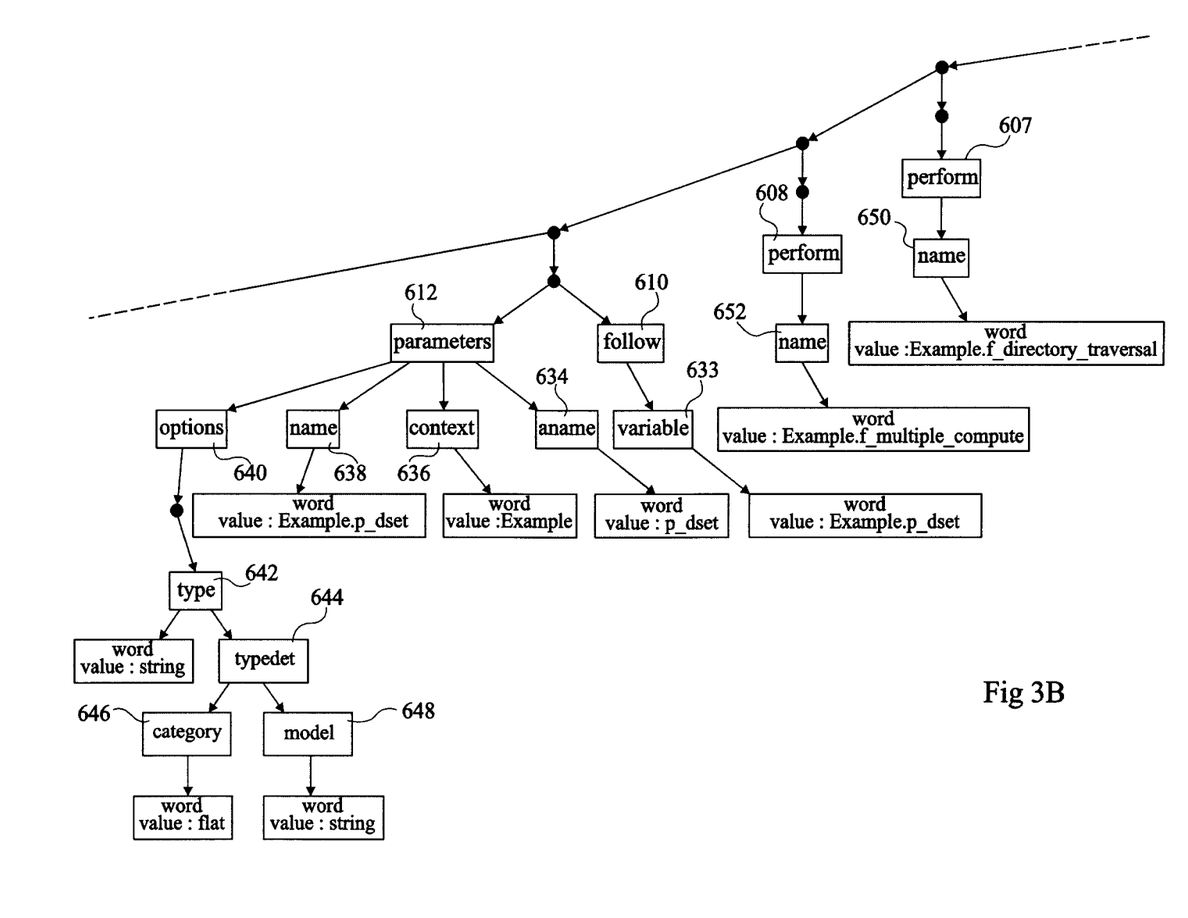
Figure 3C:
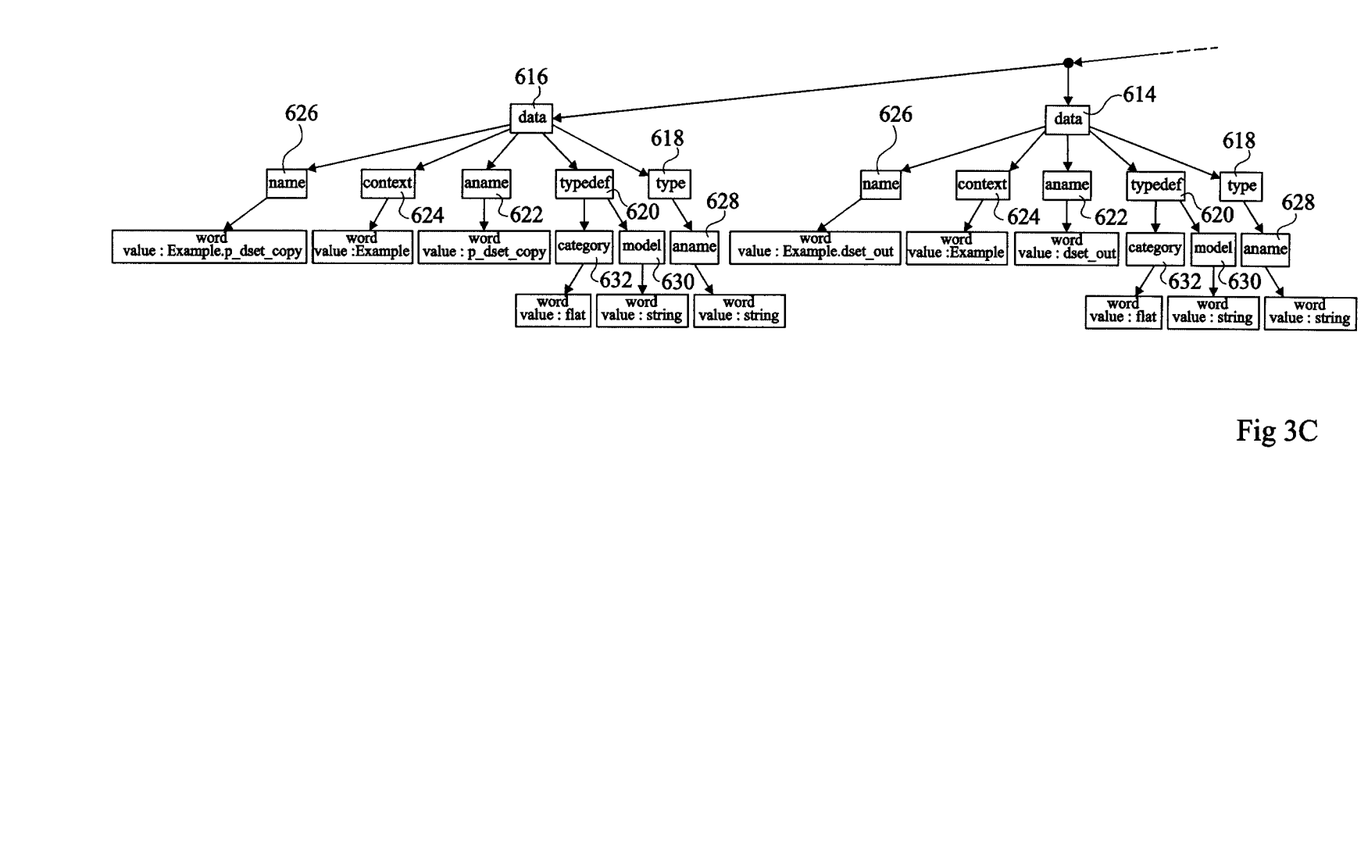

FIGS. 3A, 3B and 3C illustrate a further example of a hierarchical representation 600 generated by the parser 114, which is based on the following program code:

```
*&---------------------------------------------------*
*& Report Example
*&---------------------------------------------------*
REPORT EXAMPLE.
DATA : p_dset_copy TYPE string,
       dset_out TYPE string.
PARAMETERS : p_dset TYPE string.
```

```
PERFORM f_multiple_compute.
PERFORM f_directory_traversal.
*&---------------------------------------------------*
*& Form f_directory_traversal
*&---------------------------------------------------*
* text
*----------------------------------------------------*
FORM f_directory_traversal.
    OPEN DATASET dset_out FOR INPUT IN BINARY MODE.
ENDFORM.        "f_directory_traversal
*&---------------------------------------------------*
*& Form f_multiple_compute
*&---------------------------------------------------*
* text
*----------------------------------------------------*
FORM f_multiple_compute.
    p_dset_copy = p_dset.
    dset_out = p_dset_copy.
ENDFORM.        "f_multiple_compute
```

With reference to the tree representation of FIGS. 3A, 3B and 3C, the above program code defines a report, which is the route node 602 of the tree. Parsing the code, the resulting tree structure comprises, below the report 602, the parameter name 604, having, as shown in a box below name 604, the word value "Example", and the following ABAP statements: a forms 605 and 606; perform operations 607 and 608; a follow statement 610; a parameters statement 612; and data statements 614 and 616.

Each of the data statements 614, 616 has parameters type 618, type definition 620, aname 622, context 624 and name 626. The type 618 of each data 614, 616 is defined by a parameter aname 628, which has a value string, as shown in a box below aname 628. The type definitions 620 of each data 614, 616 is defined by a model 630 having a string value, as shown in the box below model 620, and a category 632 having a flat value, as shown in the box below category 632. The aname 622 of data 614 is dset_out, while the aname 622 of data 616 is p_dset_copy, as shown in the boxes below the aname fields 628. The values of context 624 for each data 614, 616 correspond to the report name EXAMPLE. As shown in boxes below names 626, the value of name 626 for data 614 is "Example.dset_out", while the value of name 626 for data 616 is "Example.p_dset_copy".

The follow statement 610 of the report 602 is a variable 633 having a value "Example.p_dset", as shown in a box below variable 633.

The parameters statement 612 of the report 602 has parameters aname 634, context 636, name 638 and options 640. As shown by respective boxes below these parameters, aname 634 has a value "p_dset", context 636 has a value "Example" and name has a value "Example.p_dset". The parameter options 640 has a sub-parameter type 642, which has a value string, and has a further sub-parameter type definition 644. The type definition 644 is defined by a category 646 having a value "flat", and a model 648 having a string value.

The two perform statements 606, 607 of report 602, which correspond to the PERFORM instructions of the above code, comprise respective name parameters 650, 652, having respective values "Example.f_directory_traversal" and "Example.f_multiple_compute", as shown by boxes below the name parameters 650, 652.

The form statement 606 of report 602 has an aname parameter 653 having a value of "f_directory_traversal", a name parameter 654 having a value "Example.f_directory_traversal", and an open dataset parameter 656 having sub-parameters "for input" 658, "binary mode" 660, and "dataset" 662 having a value "Example.dset_out".

The form instruction 605 of report 602 has parameters aname 664, name 666, having values respectively of "f_multiple_compute" and "Example.f_multiple_compute", and further compute parameters 668 and 670. Each of the compute parameters 668 and 670 has a destination 672 and a source 674 sub-parameter, those of compute parameter 668 having variable values "Example.dset_out" and "Example.dset_copy" respectively, and those of compute parameter 670 having variable values "Example.p_dset_copy" and "Example.p_dset" respectively.

Thus, as illustrated in FIGS. 2 and 3A to 3C, after parsing, the program is represented in a tree format that clearly represents the execution steps of the program.

In one example, the parser is implemented based on the Flex and GNU Bison tools, from which a C code implementation of the parser is automatically generated.

Flex for example provides the lexer, having the role of reading the input and returning the category of information that has been read. For example, the category could be a keyword, a number, a literal, a comment, an identifier etc.

Bison for example provides the parser. In particular, it calls the lexer to get each read element one by one. Its role is to recognize each pattern corresponding to an ABAP statement, and to build the syntactical tree, which represents the execution steps of the program.

Figure 4:
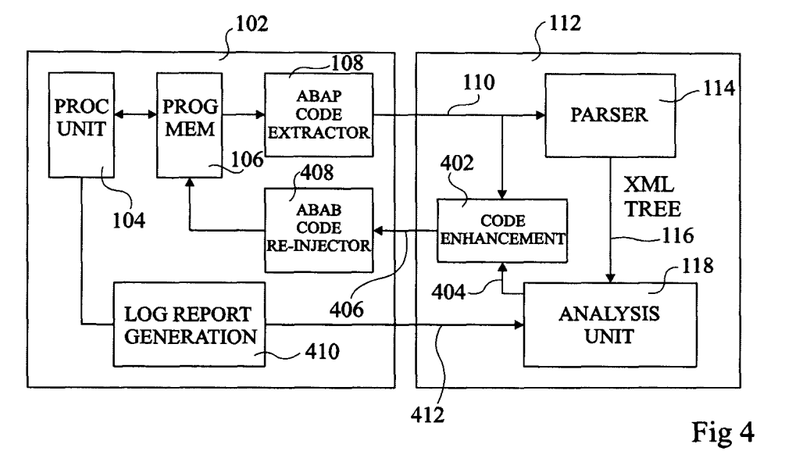
FIG. 4 illustrates the system of FIG. 1 in more detail wherein the test unit is arranged to perform runtime analysis of an application according to embodiments of the present invention.

FIG. 4 illustrates the SAP server 102 and the test unit 112 according to an alternative embodiment in which a run-time test is additionally or alternatively performed. Like features with FIG. 1 have been labelled with like reference numerals and will not be described again in detail. The run-time test for example allows performance and/or test exhaustiveness to be tested during simulation, as will now be described.

As illustrated, with respect to FIG. 1, the test unit 112 of FIG. 4 additionally comprises a code enhancement unit 402, which receives the ABAP code from the ABAP code extractor 108, and enhances it based on an analysis of the XML tree by the analysis unit 118. In particular, the analysis unit 118 may control, via an output 404 to the code enhancement unit 402, the insertion of log value generation instructions into the extracted ABAP code. The enhanced ABAP code is then provided on a line 406 back into the SAP environment, and in particular to an ABAP code re-injector 408, which re-converts the code to a suitable format and re-injects it into the program memory 106.

A log report generation module 410 then allows log values generated by the processing unit 104 while executing the enhanced ABAP code to be grouped and output on a line 412 to the test unit 112, and in particular to the analysis unit 118. The analysis unit 118 also receives in parallel an XML tree based on the parsed extracted enhanced ABAP code, allowing a comparison to be made with respect to the log values. In particular, for each log value, one or more threshold levels are for example defined indicating an acceptable range or value for the log value, as will be described in more detail with reference to FIG. 8.

Figure 5:
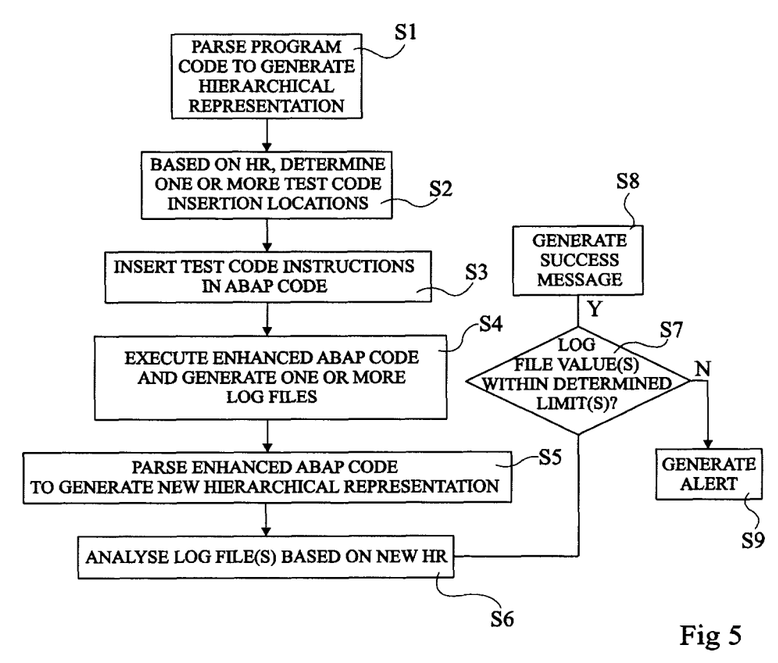
FIG. 5 is a flow diagram showing steps in a method for performing runtime analysis according to embodiments of the present invention.

FIG. 5 is a flow diagram showing steps in a method for performing a run-time test using the device of FIG. 4.

In a first step S1, the extracted ABAP program is parsed to generate a hierarchical representation, such as an XML tree.

In a next step S2, based on the hierarchical representation, test code insertion locations are determined in the code. This insertion can be automatic in the case of a test exhaustiveness verification, which verifies that the entire code has been executed. Alternatively, if the user wishes to check the performance of a given function, or portion of the program, the user may select this via an appropriate user interface.

In a next step S3, the test code instructions are inserted into the ABAP code by the code enhancement module 402. In particular, log value generation instructions are inserted in the ABAP program, which for example cause log values to be generated that indicate that at least one instruction of the ABAP program has been executed, and/or the execution time of at least one instruction. In particular, the instruction could comprise a pair of log macros, one inserted before a given instruction, that records the time before the given instruction is launched, and a second inserted after the given instruction, which recodes the time after the instruction has been executed.

In a next step S4, the enhanced ABAP code is loaded into the program memory 106, and executed by the processing unit 104, thereby causing the generation of log values when the log value generation instructions come to be executed.

In a next step S5, the enhanced ABAP code is for example extracted and parsed, to generate a syntactical hierarchical representation that is used for analysis of the log file. Alternatively, the representation generated in S1, with an identification of the locations of the macro insertions, could be used to perform this analysis.

In a next step S6, the log files are analysed based on the hierarchical representation generated in step S5. In particular, this allows a correspondence to be determined between the log value generation instructions as originally inserted, and the log values generated by the processing unit 104. The pairing of log values to a syntactical tree representation of the ABAP code is of particular advantage given the general difficulty in effectively matching log values to the code location at which they result.

In a next step S7, it is be determined whether the log values are within one or more determined limits. This step is for example performed automatically. If so, the next step is S8, in which a success message is generated, whereas if not, the next step is S9, in which an alert message is generated. For example, the messages displayed to a user could be based on traffic light signals, a green coloured circle displayed in relation to a portion of code indicating success, while a red coloured circle displayed in relation to a portion of code indicating an alert.

Advantages of the embodiments of FIGS. 4 and 5 are that they allow simple and effective run-time tests to be performed, while addressing the technical problem of pairing the resulting log values with the code. In particular, based on the hierarchical representation and the log value generation instructions inserted into the code, the log values may be interpreted in a simple fashion to identify a portion of code associated with the log values. Once identified, this portion of code can be modified to improve performance of the program. For example, as explained above in relation to FIG. 5, to identify the code corresponding to the log values, the test code insertion locations with respect to the hierarchical representation can used, for example by generating a new hierarchical representation of the enhanced computer program.

While a number of particular embodiments of the invention have been described, it will be apparent to those skilled in the art that numerous modifications may be applied.

For example, it will be apparent to those skilled in the art that the tree diagrams of FIGS. 2 and 3A to 3C illustrate just one example, there being other types of tree representation that could be used.

Furthermore, it will be apparent to those skilled in the art that the flow diagram of FIG. 5 is just one example, and that modifications could be performed, such as changing the order of the steps, or removing some steps.

Furthermore it will be apparent to those skilled in the art that the various features described in relation to the various embodiments could be combined in any combination in alternative embodiments of the invention.

The invention claimed is:

1. A method comprising:
   extracting, by one or more devices, a first computer program from a first application environment;
   parsing, by the one or more devices, the extracted first computer program to generate a hierarchical representation of the extracted first computer program;
   analyzing, by the one or more devices, the hierarchical representation of the extracted first computer program to identify one or more functions,
      the one or more identified functions being included in the first computer program;
   receiving, by the one or more devices, information associated with checking a performance of at least one of the one or more identified functions;
   inserting, by the one or more devices and based on the received information, at least one log value generation instruction into the extracted first computer program to generate a second computer program,
      each log value generation instruction, of the at least one log value generation instruction, being inserted in a respective location of the extracted first computer program that corresponds to a respective location of each identified function of the one or more identified functions, and
      the second computer program including the first computer program and the inserted at least one log value generation instruction;
   executing, by the one or more devices and in the first application environment, the second computer program;
   parsing, by the one or more devices and based on executing the second computer program, the second computer program to generate a hierarchical representation of the second computer program;
   determining, by the one or more devices and based on the hierarchical representation of the second computer program, if information associated with one or more generated log values satisfies a predetermined value,
      the one or more generated log values being based on the inserted at least one log value generation instruction; and
   outputting, by the one or more devices, a result of the determination.

2. The method of claim 1, further comprising:
   generating, when the information associated with the one or more generated log values does not satisfy the predetermined value, an alert.

3. The method of claim 1, where the predetermined value is based on the hierarchical representation of the second computer program.

4. The method of claim 1, further comprising:
   generating, when the information associated with the one or more generated log values satisfies the predetermined value, a success message.

5. The method of claim 1, where the one or more generated log values indicate at least one of:
   an execution of at least one instruction, or
   an execution time of at least one instruction.

6. The method of claim 1, where, when parsing the extracted first computer program, the method includes:
   parsing the extracted first computer program in a second application environment,
      the second application environment being different than the first application environment.

7. The method of claim 1, further comprising:
   associating, when the information associated with the one or more generated log values satisfies the predetermined value, first information with a first location of the first computer program; or
   associating, when the information associated with the one or more generated log values does not satisfy the predetermined value, second information with the first location of the first computer program,
      the first information being different than the second information.

8. A system comprising:
   a memory storing instructions; and
   one or more devices to execute the stored instructions to:
      extract a first computer program from a first application environment;
      parse the extracted first computer program to generate a hierarchical representation of the extracted first computer program;
      analyze the hierarchical representation of the extracted first computer program to identify one or more functions,
         the one or more identified functions being included in the first computer program;
      receive information associated with checking a performance of at least one of the one or more identified functions;
      insert, based on the received information, at least one log value generation instruction into the extracted first computer program to generate a second computer program,
         each log value generation instruction, of the at least one log value generation instruction, being inserted in a respective location of the extracted first computer program that corresponds to a respective location of each identified function of the one or more identified functions, and
         the second computer program including the first computer program and the inserted at least one log value generation instruction;
      execute, in the first application environment, the second computer program;
      parse, based on executing the second computer program, the second computer program to generate a hierarchical representation of the second computer program;
      determine, based on the hierarchical representation of the second computer program, if information associated with one or more generated log values satisfies a predetermined value,
         the one or more generated log values being based on the inserted at least one log value generation instruction; and
      output a result of the determination.

9. The system of claim 8, where the one or more devices are further to:
   generate, when the information associated with the one or more generated log values does not satisfy the predetermined value, an alert.

10. The system of claim 8, where the one or more devices are further to:
    generate, when the information associated with the one or more generated log values satisfies the predetermined value, a success message.

11. The system of claim 8, where the predetermined value is based on the hierarchical representation of the second computer program.

12. The system of claim 8, where the one or more generated log values indicate at least one of:
an execution of at least one instruction, or
an execution time of at least one instruction.

13. The system of claim 8, where the one or more devices, when parsing the extracted first computer program, are further to:
parse the extracted first computer program in a second application environment,
the second application environment being different than the first application environment.

14. The system of claim 8, where the one or more devices are further to:
associate, when the information associated with the one or more generated log values satisfies the predetermined value, first information with a first location of the first computer program; or
associate, when the information associated with the one or more generated log values does not satisfy the predetermined value, second information with the first location of the first computer program,
the first information being different than the second information.

15. A non-transitory computer readable medium storing instructions, the instructions comprising:
one or more instructions which, when executed by at least one processor, cause the at least one processor to:
extract a first computer program from a first application environment;
parse the extracted first computer program to generate a hierarchical representation of the extracted first computer program;
analyze the hierarchical representation of the extracted first computer program to identify one or more functions,
the one or more identified functions being included in the first computer program;
receive information associated with checking a performance of at least one of the one or more identified functions;
insert, based on the received information, at least one log value generation instruction into the extracted first computer program to generate a second computer program,
each log value generation instruction, of the at least one log value generation instruction, being inserted in a respective location of the extracted first computer program that corresponds to a respective location of each identified function of the one or more identified functions, and
the second computer program including the first computer program and the inserted at least one log value generation instruction;
execute, in the first application environment, the second computer program;
parse, based on executing the second computer program, the second computer program to generate a hierarchical representation of the second computer program;
determine, based on the hierarchical representation of the second computer program, if information associated with one or more generated log values satisfies a predetermined value,
the one or more generated log values being based on the inserted at least one log value generation instruction; and
output a result of the determination.

16. The non-transitory computer readable medium of claim 15, where the instructions further include:
one or more instructions to generate, when the information associated with the one or more generated log values does not satisfy the predetermined value, an alert.

17. The non-transitory computer readable medium of claim 15, where the instructions further include:
one or more instructions to generate, when the information associated with the one or more generated log values satisfies the predetermined value, a success message.

18. The non-transitory computer readable medium of claim 15, where the predetermined value is based on the hierarchical representation of the second computer program.

19. The non-transitory computer readable medium of claim 15, where the one or instructions to parse the extracted first computer program include:
one or instructions to parse the extracted first computer program in a second application environment,
the second application environment being different than the first application environment.

20. The non-transitory computer readable medium of claim 15, where the instructions further include:
one or more instructions to associate, when the information associated with the one or more generated log values satisfies the predetermined value, first information with a first location of the first computer program; or
one or more instructions to associate, when the information associated with the one or more generated log values does not satisfy the predetermined value, second information with the first location of the first computer program,
the first information being different than the second information.

* * * * *